(12) United States Patent
Mizuno et al.

(10) Patent No.: US 6,259,594 B1
(45) Date of Patent: Jul. 10, 2001

(54) NONREDUCING DIELECTRIC CERAMIC AND MONOLITHIC CERAMIC CAPACITOR

(75) Inventors: Shinobu Mizuno, Muko; Tomoyuki Nakamura, Shiga-ken; Harunobu Sano, Kyoto, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/577,957

(22) Filed: May 24, 2000

(30) Foreign Application Priority Data

May 24, 1999 (JP) .................................................. 11-142742

(51) Int. Cl.$^7$ ...................................................... H01G 4/06
(52) U.S. Cl. ..................... 361/321.2; 361/321.2; 361/321.4; 361/321
(58) Field of Search .............................. 361/321.2, 321.4, 361/321.5, 321, 306; 501/134, 137

(56) References Cited

U.S. PATENT DOCUMENTS

| | | | |
|---|---|---|---|
| 5,065,275 | * 11/1991 | Fujisaki et al. | 361/321.2 |
| 5,202,814 | * 4/1993 | Kohno et al. | 361/321 |
| 5,600,533 | * 2/1997 | Sano et al. | 361/321.4 |
| 5,731,950 | * 3/1998 | Sakamoto et al. | 361/321.4 |
| 5,852,542 | * 12/1998 | Wada et al. | 361/321.5 |

* cited by examiner

Primary Examiner—Dean A. Reichard
Assistant Examiner—Nguyen T Ha
(74) Attorney, Agent, or Firm—Ostrolenk, Faber, Gerb & Soffen, LLP

(57) ABSTRACT

A nonreducing dielectric ceramic has a perovskite structure represented by the formula $ABO_3$ with a principal crystal phase comprising barium titanate as a principal constituent. The crystal axis ratio c/a determined by the X-ray diffraction method at a temperature of $-25°$ C. or more satisfies the relationship $1.000 \leq c/a \leq 1.003$. Preferably, the nonreducing dielectric ceramic has a phase transition point of less than $-25°$ C. Preferably, the nonreducing dielectric ceramic contains at least one rare-earth element. A monolithic ceramic capacitor including dielectric ceramic layers composed of a nonreducing dielectric ceramic in accordance with the present invention is also disclosed.

20 Claims, 1 Drawing Sheet

NONREDUCING DIELECTRIC CERAMIC AND MONOLITHIC CERAMIC CAPACITOR

BACKGROUND OF THE INVENTION

1. Field of the Invention

The present invention relates to nonreducing dielectric ceramics and monolithic ceramic capacitors provided with dielectric ceramic layers composed of the nonreducing dielectric ceramics. More particularly, the invention relates to monolithic ceramic capacitors which are advantageously used under the conditions of high-frequency AC or high to medium voltage DC and are provided with internal electrodes composed of base metals, and to nonreducing dielectric ceramics for constituting dielectric ceramic layers of the monolithic ceramic capacitors.

2. Description of the Related Art

A conventional monolithic capacitor is usually produced in a method described below.

First, a plurality of ceramic green sheets containing a dielectric material for forming dielectric ceramic layers are prepared, in which the surface of each ceramic green sheet is coated with an electrode material for forming internal electrodes. As the dielectric material, for example, a material containing $BaTiO_3$ as a principal constituent is used. The plurality of ceramic green sheets each coated with the electrode material are laminated and are subjected to thermal compression, and the resultant compact is fired, and thus a ceramic laminate provided with internal electrodes is obtained. By fixing and baking external electrodes that electrically connect to the internal electrodes on the sides of the ceramic laminate, a monolithic ceramic capacitor is obtained.

Accordingly, as the material for such internal electrodes, typically, a material which is not oxidized by the firing of ceramic laminates has been selected. Examples of such a material include noble metals such as platinum, gold, palladium, and silver-palladium alloys. However, although such materials for internal electrodes have excellent characteristics, they are very expensive, resulting in an increase in production cost of monolithic ceramic capacitors.

In order to reduce the production cost, monolithic ceramic capacitors provided with internal electrodes composed of base metals such as nickel and copper which are relatively inexpensive have been disclosed.

However, the base metals are easily oxidized in high-temperature, oxidizing atmospheres, which ruins the function as the internal electrodes. In order to use base metals as materials for internal electrodes of monolithic ceramic capacitors, firing must be performed in a neutral or reducing atmosphere to obtain ceramic laminates. On the other hand, if firing is performed under a low oxygen partial pressure, such as in a neutral or reducing atmosphere, the ceramic constituting dielectric ceramic layers is significantly reduced and becomes semiconductive.

Therefore, dielectric ceramics which do not become semi-conductive even if firing is performed under a low oxygen partial pressure in order to avoid the oxidation of base metals have been disclosed. For example, Japanese Examined Patent Publication No. 61-14611 discloses a $BaTiO_3$—$(Mg, Zn, Sr, Ca)O$—$B_2O_3$—$SiO_2$-based dielectric ceramic, and Japanese Unexamined Patent Publication No. 7-272971 discloses a $(Ba, M, L)(Ti, R)O_3$-based dielectric ceramic (where M is Mg or Zn, L is Ca or Sr, and R is Sc, Y or a rare-earth element).

With the recent development of electronic devices which are highly integrated, have sophisticated functions, and are inexpensive, the characteristics required for use of monolithic ceramic capacitors have become severer. There is now a great demand for lower loss, better insulating properties, higher dielectric strength, higher reliability, larger capacity, lower prices, etc. with respect to monolithic ceramic capacitors.

Recently, the demand is also increasing for monolithic ceramic capacitors which can be used at high frequencies and high voltages or high currents. In such a case, small loss and low heat emission are important characteristics required for monolithic ceramic capacitors. The reason for this is that if a monolithic ceramic capacitor has large loss and high heat emission, the life of the monolithic ceramic capacitor itself is shortened. Due to the loss and heat emission of the monolithic ceramic capacitor, the temperature in circuits is also increased, resulting in operation errors and shortening of life with respect to peripheral components.

Moreover, monolithic ceramic capacitors are increasingly used under high-voltage DC conditions. However, since the conventional monolithic ceramic capacitors which particularly uses nickel as the material for internal electrodes are intended to be used at a relatively low electric field intensity, if they are used at high electric field intensity, insulating properties, dielectric strength and reliability are greatly deteriorated, which is disadvantageous.

When monolithic ceramic capacitors are produced using dielectric ceramics disclosed in Japanese Examined Patent Publication No. 61-14611 and Japanese Unexamined Patent Publication No. 7-272971, although the temperature-dependent variation in the capacitance is small, the loss and heat emission are increased during use at high frequencies and high voltages or high currents. Since such dielectric ceramics are nonreducing, it is possible to use base metals such as nickel as the material for internal electrodes by firing under a low oxygen partial pressure. However, when monolithic ceramic capacitors obtained by such firing under a low oxygen partial pressure are used under high-voltage DC conditions, insulation resistance is decreased and reliability is also decreased, which is disadvantageous.

SUMMARY OF THE INVENTION

Accordingly, it is an object of the present invention to provide a nonreducing dielectric ceramic which is advantageously used, for example, to constitute dielectric ceramic layers in a monolithic ceramic capacitor, in which small loss and low heat emission are exhibited when used at high frequencies and high voltages or high currents, and stable insulation resistance is exhibited at AC high-temperature load or DC high-temperature load.

It is another object of the present invention to provide a monolithic ceramic capacitor in which an inexpensive base metal such as nickel or a nickel alloy can be used as the material for internal electrodes thereof while achieving the object described above.

In one aspect, a nonreducing dielectric ceramic in accordance with the present invention has a perovskite structure represented by the formula $ABO_3$ with a principal crystal phase containing barium titanate as a principal constituent. The crystal axis ratio $c/a$ determined by the X-ray diffraction method at a temperature of $-25°$ C. or more satisfies the relationship $1.000 \leq c/a \leq 1.003$. That is, the crystal structure includes a cubic system or a crystal system analogous to a cubic system.

In the nonreducing dielectric ceramic, with respect to the temperature dependence of the relative dielectric constant measured at an AC electric field of 2 V rms/mm or less at a frequency of 1 kHz, the phase transition point of the principal crystal phase, namely, the temperature at which the variation in the relative dielectric constant reaches the sharp maximum value (peak), is preferably less than −25° C. Additionally, a barium titanate-based dielectric ceramic has the cubic system at a temperature that is equal to or greater than the phase transition point, i.e., the Curie point, and has the tetragonal system at a temperature below the phase transition point.

Preferably, the nonreducing dielectric ceramic contains at least one rare-earth element selected from the group consisting of La, Ce, Pr, Nd, Sm, Eu, Gd, Th, Dy, Ho, Er, Tm, Yb, Lu, Y and Sc. If such a rare-earth element is present, the dielectric ceramic used under DC conditions can have satisfactory life properties.

In another aspect, a monolithic ceramic capacitor in accordance with the present invention includes a plurality of dielectric ceramic layers, internal electrodes formed between the dielectric ceramic layers and external electrodes electrically connected to the internal electrodes. In the monolithic ceramic capacitor, the dielectric ceramic layers are composed of the nonreducing dielectric ceramic in accordance with the present invention described above.

Preferably, the internal electrodes of the monolithic ceramic capacitor are composed of nickel, a nickel alloy, copper, or a copper alloy.

Preferably, each external electrode of the monolithic ceramic capacitor includes a first layer composed of a sintered layer containing a powdered conductive metal or a powdered conductive metal with glass frit added thereto, and a second layer composed of a plating layer.

DESCRIPTION OF THE PREFERRED EMBODIMENT

Figure 1:
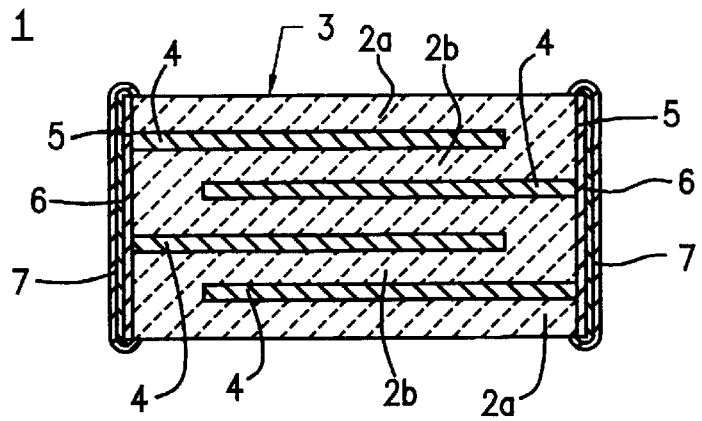
FIG. 1 is a sectional view showing a monolithic ceramic capacitor 1 of an embodiment of the present invention.
Figure 2:
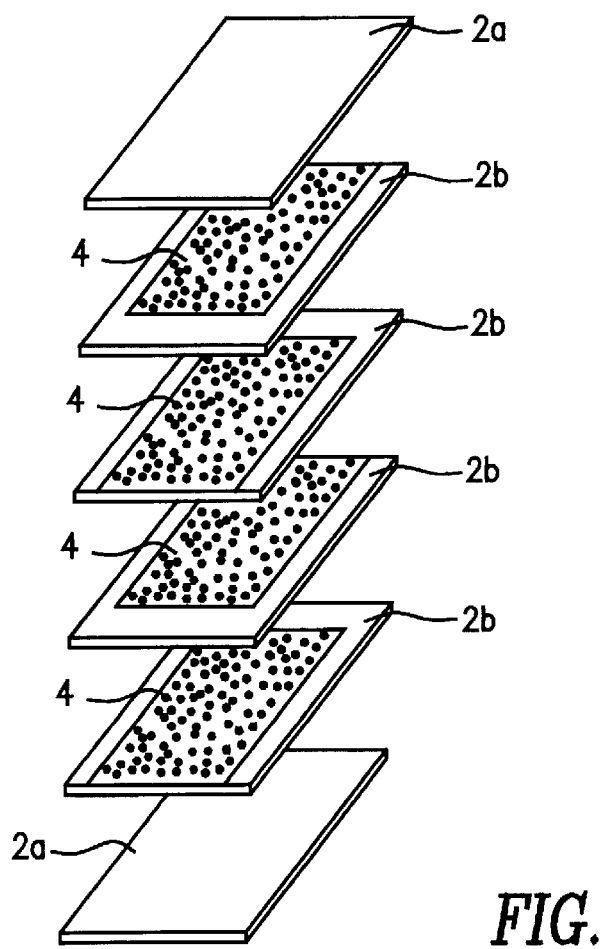
FIG. 2 is an assembly view of a ceramic laminate 3 provided in the monolithic ceramic capacitor 1 shown in FIG. 1.

FIG. 1 is a sectional view showing a monolithic ceramic capacitor 1 of an embodiment of the present invention and FIG. 2 is an assembly view of a ceramic laminate 3 provided in the monolithic ceramic capacitor 1 shown in FIG. 1.

The monolithic ceramic capacitor 1 includes a ceramic laminate 3, which is a rectangular parallelepiped, obtained by laminating a plurality of dielectric ceramic layers 2a and 2b with internal electrodes 4 therebetween. An external electrode 5 is formed on each side of the ceramic laminate 3 so as to be electrically connected to specific internal electrodes 4. A first plating layer 6 composed of nickel, copper, or the like is formed on the external electrode 5, and a second plating layer 7 composed of solder, tin, or the like is further formed thereon.

A method of fabricating the monolithic ceramic capacitor 1 will be described in sequence.

First, a barium titanate-based starting powder as a principal constituent of dielectric ceramic layers 2a and 2b is prepared, which is weighed and mixed with other materials so as to satisfy the predetermined composition.

By firing the starting powder, as described above, a nonreducing dielectric ceramic having a perovskite structure represented by the formula $ABO_3$ with a principal crystal phase containing barium titanate as a principal constituent is produced. In the nonreducing dielectric ceramic, the crystal axis ratio c/a determined by the X-ray diffraction method at a temperature of −25° C. or more satisfies the relationship $1.000 \leq c/a \leq 1.003$. In the nonreducing dielectric ceramic, with respect to the temperature dependence of the relative dielectric constant measured at an AC electric field of 2 V rms/mm or less at a frequency of 1 kHz, the phase transition point of the principal crystal phase is preferably less than −25° C. Furthermore, the staring powder contains, as required, at least one rare-earth element selected from the group consisting of La, Ce, Pr, Nd, Sm, Eu, Gd, Th, Dy, Ho, Er, Tm, Yb, Lu, Y and Sc, for example, in the form of an oxide thereof.

Next, an organic binder is added to the starting powder described above to form a slurry, and the slurry is formed into a sheet, and thus ceramic green sheets for the dielectric ceramic layers 2a and 2b are obtained.

An internal electrode 4 containing a base metal, such as nickel, a nickel alloy, copper or a copper alloy, as a conductive component is formed on one of the principal surfaces of each of the ceramic green sheets for the dielectric ceramic layers 2b. The internal electrodes 4 may be formed by printing such as screen-printing, vapor deposition, plating or the like.

Next, a required number of ceramic green sheets for the dielectric ceramic layers 2b provided with the internal electrodes 4 are laminated, and as shown in FIG. 2, the green sheets are sandwiched by ceramic green sheets for the dielectric ceramic layers 2a which are not provided with internal electrodes, followed by press-bonding, and thus a green laminate is obtained.

By firing the green laminate in a predetermined atmosphere at a predetermined temperature, the ceramic laminate 3 is obtained.

The external electrodes 5 are formed on both sides of the ceramic laminate 3 so as to be electrically connected to specific internal electrodes 4. As the material for the external electrodes 5, the same material as that for the internal electrodes 4 may be used. Alternatively, silver, palladium, a silver-palladium alloy, copper, a copper alloy, etc., may be used, or metal powders thereof combined with glass frit, such as $B_2O_3$—$SiO_2$—BaO-based glass or $Li_2O$—$SiO_2$—BaO-based glass, may be used. An appropriate material is selected depending on the application of the monolithic ceramic capacitor 1, the place where the monolithic ceramic capacitor 1 is used, etc. Although the external electrodes 5 are typically formed by applying a metallic powder paste to the ceramic laminate 3 which has been obtained by firing, followed by baking, the metallic powder paste may be applied to the green ceramic laminate before firing and the external electrodes 5 may be formed by firing simultaneously with the ceramic laminate 3.

The first plating layer 6 is then formed by plating nickel, copper or the like on the external electrodes 5. Lastly, the second plating layer 7 composed of solder, tin or the like is formed on the first plating layer 6, and thus the monolithic ceramic capacitor 1 is completed. It may be possible to omit forming conductive layers, such as plating layers described above, on the external electrodes 5, depending on the application of the monolithic ceramic capacitor.

As described above, in the monolithic ceramic capacitor 1 obtained by using the nonreducing dielectric ceramic to constitute the dielectric ceramic layers 2a and 2b, the loss and heat emission during use at high frequencies and high voltages or high currents can be reduced, the insulation resistance in the AC high-temperature load or DC high-temperature load can be stabilized, and a base metal such as nickel or a nickel alloy can be used as the material for the internal electrodes 4 without any problems.

EXAMPLE

The nonreducing dielectric ceramic and the monolithic ceramic capacitor in accordance with the present invention will be described in more detail based on an example.

First, as starting materials, powders of $BaCO_3$, $CaCO_3$, $SrCO_3$, $TiO_2$, $ZrO_2$, $BaTiO_3$, $CaZrO_3$, $SrTiO_3$, $La_2O_3$, $CeO_2$, $Pr_6O_{11}$, $Nd_2O_3$, $Sm_2O_3$, $Ho_2O_3$, $Dy_2O_3$, $Gd_2O_3$, $Eu_2O_3$, $Tb_2O_3$, $Er_2O_3$, $Tm_2O_3$, $Yb_2O_3$, $Lu_2O_3$, $Y_2O_3$, $Sc_2O_3$, MgO, $MnCO_3$ and $SiO_2$ having purities of 99% or more were prepared.

The above starting powders were weighed so as to satisfy the compositions and molar ratios shown in Table 1 below. With respect to sample Nos. 14 and 15 in Table 1, compound oxides were used as starting materials.

Next, a polyvinyl butyral-based binder and an organic solvent such as ethanol were added to the weighed powders of the individual samples, wet blending was performed with a ball mill, and ceramic slurries were obtained. The ceramic slurries were formed into sheets by the doctor blade process, and rectangular ceramic green sheets having a thickness of 25 μm were obtained.

With respect to each sample, a conductive paste containing nickel as a principal constituent was printed on specific ceramic green sheets, and conductive paste layers for constituting internal electrodes were formed.

A plurality of ceramic green sheets provided with the conductive paste layers were laminated in such a manner that the ends at which the conductive paste layers were exposed alternately faced different ends of the laminate to be formed, and a ceramic green sheet not provided with conductive paste layers was disposed on each of the upper and lower surfaces of the laminate. Press-bonding was then performed, and thus a green ceramic laminate was obtained.

The green ceramic laminate was heated at 350° C. in a nitrogen atmosphere, and after the binder was removed, firing was performed for 2 hours at a temperature in the range of 1,200° C. to 1,350° C. in a reducing atmosphere comprising gases of $H_2$, $N_2$ and $H_2O$ having an oxygen partial pressure of $10^{-9}$ to $10^{-12}$ MPa, and a sintered ceramic laminate was obtained.

A conductive paste containing $B_2O_3$—$Li_2O$—$SiO_2$—BaO-based glass frit and silver powder was applied to both ends of the sintered ceramic laminate, and baking was performed at 600° C. in a nitrogen atmosphere, and thus external electrodes which are electrically connected to the internal electrodes were formed.

Next, a nickel plating solution composed of nickel sulfate, nickel chloride and boric acid was prepared, and nickel plating was performed on the external electrodes by barrel plating. Lastly, a solder plating solution composed of an alkanolsulfonic acid bath (AS bath) was prepared, and solder plating was performed on the nickel plating layer by barrel plating, and thus a monolithic ceramic capacitor was obtained.

The resultant monolithic ceramic capacitor had outer dimensions in which the width was 3.2 mm, the length was 4.5 mm and the thickness was 1.0 mm, and the dielectric ceramic layers interposed between the internal electrodes had a thickness of 20 μm. The effective counter area of each internal electrode was $8.8 \times 10^{-6}$ m². With respect to the total number of the effective dielectric ceramic layers, firing was performed so that the capacitance was 50 nF.

Next, characteristics of the resultant monolithic capacitor and the dielectric ceramic constituting the dielectric ceramic

TABLE 1

| Sample No. | 1 | 2 | 3 | *4 | *5 | *6 | *7 | 8 | 9 | 10 | 11 | 12 | 13 | 14 | 15 |
|---|---|---|---|---|---|---|---|---|---|---|---|---|---|---|---|
| Composition (molar ratio) | | | | | | | | | | | | | | | |
| $BaCO_3$ | 100 | 100 | 100 | 100 | 100 | 100 | 100 | 100 | 100 | 100 | 100 | 100 | 100 | 0 | 0 |
| $CaCO_3$ | 8 | 1 | 0 | 1 | 0 | 0 | 0 | 0 | 0 | 5 | 0 | 1 | 20 | 0 | 0 |
| $SrCO_3$ | 1 | 1 | 0 | 0 | 0 | 0 | 0 | 0 | 4 | 60 | 1 | 1 | 20 | 0 | 0 |
| $TiO_2$ | 101 | 101 | 100 | 100 | 100 | 100 | 100 | 100 | 104 | 125 | 101 | 100 | 200 | 0 | 0 |
| $ZrO_2$ | 8 | 1 | 0 | 1 | 0 | 0 | 0 | 0 | 0 | 40 | 0 | 1 | 20 | 0 | 0 |
| $BaTiO_3$ | 0 | 0 | 0 | 0 | 0 | 0 | 0 | 0 | 0 | 0 | 0 | 0 | 0 | 100 | 100 |
| $CaZrO_3$ | 0 | 0 | 0 | 0 | 0 | 0 | 0 | 0 | 0 | 0 | 0 | 0 | 0 | 3 | 0 |
| $SrTiO_3$ | 0 | 0 | 0 | 0 | 0 | 0 | 0 | 0 | 0 | 0 | 0 | 0 | 0 | 0 | 1 |
| $La_2O_3$ | 0 | 1 | 0 | 0 | 0 | 0 | 0 | 0 | 0 | 0 | 0 | 0 | 0 | 1 | 0 |
| $CeO_2$ | 0 | 0 | 0 | 2 | 0 | 0 | 0 | 0 | 0 | 0 | 0 | 0 | 0 | 0 | 0 |
| $Pr_6O_{11}$ | 0 | 0 | 0 | 0 | 0 | 0 | 0 | 3.5 | 0 | 0 | 0 | 0 | 0 | 0 | 0 |
| $Nd_2O_3$ | 0 | 0.5 | 0 | 0 | 0 | 0 | 0 | 0 | 2 | 0 | 0 | 0 | 0 | 1 | 0 |
| $Sm_2O_3$ | 0 | 1 | 2 | 0 | 0 | 0 | 0 | 1.5 | 0 | 0 | 0 | 0 | 0 | 0 | 0 |
| $Ho_2O_3$ | 0 | 0 | 2 | 0 | 0.5 | 0 | 0 | 0 | 0 | 0 | 0 | 1 | 0 | 0 | 1 |
| $Dy_2O_3$ | 0 | 0 | 0 | 1 | 0 | 1 | 0 | 0 | 0 | 0.15 | 0 | 1 | 0 | 0 | 0 |
| $Gd_2O_3$ | 2 | 0 | 3 | 0 | 0 | 0 | 0 | 0 | 0 | 0 | 1 | 0 | 0 | 5 | 0 |
| $Eu_2O_3$ | 0 | 0 | 0 | 0 | 0 | 0 | 1 | 0 | 0 | 0 | 0 | 0 | 0 | 0 | 1 |
| $Tb_2O_3$ | 0 | 0 | 0 | 0 | 0 | 0.5 | 0 | 0 | 0 | 0 | 0 | 0 | 0 | 1 | 0 |
| $Er_2O_3$ | 0 | 0.5 | 0 | 0 | 0 | 0 | 0 | 0 | 0 | 0 | 0 | 0 | 0 | 1 | 0 |
| $Tm_2O_3$ | 0 | 0 | 0 | 0 | 0.5 | 0 | 0 | 0 | 0 | 0 | 1.5 | 0 | 0 | 0 | 0 |
| $Yb_2O_3$ | 0 | 1 | 0 | 0 | 0.5 | 0 | 0 | 0 | 0 | 0 | 0 | 0 | 0 | 0 | 0 |
| $Lu_2O_3$ | 0 | 0 | 0 | 0 | 0 | 0 | 0 | 0 | 1 | 0 | 0 | 0 | 0 | 1 | 0 |
| $Y_2O_3$ | 0 | 0 | 1 | 0 | 0 | 0 | 0 | 0 | 0 | 0 | 0 | 1 | 0 | 0 | 0 |
| $Sc_2O_3$ | 0 | 0 | 0 | 0 | 0.5 | 0 | 0 | 0 | 1 | 0 | 0 | 0 | 0 | 0 | 0 |
| MgO | 4 | 6 | 11 | 3 | 2 | 1.5 | 1 | 12 | 3 | 2.5 | 2.5 | 4 | 1 | 12 | 2.5 |
| $MnCO_3$ | 0.5 | 0.5 | 0.8 | 0.3 | 0.3 | 0.4 | 0.4 | 1 | 0.5 | 0.5 | 0.3 | 0.3 | 0.3 | 1 | 0.3 |
| $SiO_2$ | 2 | 2 | 2.5 | 2 | 2 | 1.5 | 1.5 | 2 | 2 | 1.5 | 2 | 2 | 1.5 | 2.5 | 2 | layers were obtained with respect to each sample. The results thereof are shown in Table 2.

in insulation resistance with time was measured for each test piece. The period of time in which the insulation resistance

TABLE 2

| | | | | | | | Sample No. | | | | | | | | |
|---|---|---|---|---|---|---|---|---|---|---|---|---|---|---|---|
| | | 1 | 2 | 3 | *4 | *5 | *6 | *7 | 8 | 9 | 10 | 11 | 12 | 13 | 14 | 15 |
| c/a | −25° C. | 1.000 | 1.000 | 1.000 | 1.005 | 1.005 | 1.007 | 1.008 | 1.000 | 1.001 | 1.000 | 1.001 | 1.000 | 1.000 | 1.003 | 1.002 |
| | +25° C. | 1.000 | 1.000 | 1.000 | 1.004 | 1.004 | 1.007 | 1.008 | 1.000 | 1.000 | 1.000 | 1.000 | 1.000 | 1.000 | 1.002 | 1.001 |
| Phase transition point (° C.) | | −60 | <−60 | <−60 | −10 | 5 | 50 | 120 | <−60 | <−60 | −45 | −25 | −40 | −50 | <−60 | −60 |
| Relative dielectric constant 25° C. | | 2520 | 1010 | 300 | 2430 | 2670 | 2170 | 2310 | 250 | 2030 | 2230 | 1980 | 1860 | 1870 | 320 | 2490 |
| Heat emission (° C.) | | 12 | 5 | 3 | 80 | Thermal runaway | Thermal runaway | Thermal runaway | 2 | 8 | 4 | 13 | 9 | 5 | 7 | 14 |
| AC load test defect rate (%) | | 0 | 0 | 0 | 80 | 100 | 100 | 100 | 0 | 0 | 0 | 0 | 0 | 0 | 0 | 0 |
| High-temperature load test (time) | | 850 | 870 | 800 | 830 | 790 | 760 | 790 | 790 | 820 | 800 | 750 | 820 | 5 | 860 | 830 |

In Table 2, the crystal axis ratio c/a was determined by a process in which the dielectric ceramic constituting the dielectric ceramic layers was subjected to X-ray diffraction analysis at temperatures of −25° C. and +25° C., respectively, the results thereof were analyzed by Rietveld method, and X-ray profile fitting was performed, and then lattice constants were computed.

With respect to the phase transition point, the capacitance of the monolithic capacitor was measured using an automatic bridge-type meter and the variation in the capacitance in relation to the temperature change was obtained. The temperature at which the variation in the capacitance reached the sharp maximum value was defined as the phase transition point. The variation in the capacitance in relation to the temperature change was measured based on the capacitance at 25° C. at a frequency of 1 kHz and at 0.02 V rms.

With respect to the relative dielectric constant, the capacitance of the monolithic ceramic capacitor was measured using an automatic bridge-type meter at a frequency of 1 kHz, at 1 V rms, and at 25° C. The relative dielectric constant was computed based on the capacitance measured.

With respect to the heat emission characteristics, the rise of the temperature was evaluated. The monolithic ceramic capacitor, which was placed in a thermostatic bath maintained at 25° C., was electrically connected to an AC power supply, and a high-frequency high voltage of 100 kHz, 100 Vp-p was applied to the monolithic capacitor continuously for 5 minutes. The difference between the temperature of the monolithic ceramic capacitor and the ambient temperature was measured using an infrared radiation thermometer.

With respect to the AC load test, the percentage of samples which were defective in insulation resistance, namely, the defect rate, was evaluated. A high-frequency high voltage of 100 kHz, 100 Vp-p was applied to the monolithic ceramic capacitor in a thermostatic bath at 100° C., and after 250 hours, the monolithic ceramic capacitor was retrieved from the thermostatic bath, and then the insulation resistance was measured at 25° C. at 500 V DC. The monolithic capacitor which exhibited a resistance of $10^6$ Ω or less was defined as being defective.

In the high-temperature load test, with respect to 36 monolithic ceramic capacitors for each sample, while a DC voltage of 500 V was being applied at 150° C., the change reached $10^6$ Ω or less was defined as the life time. The average of all test pieces for each sample was computed.

In Tables 1 and 2, the asterisked samples were out of the scope of the present invention.

With respect to the sample Nos. 1 to 3 and Nos. 8 to 15, which were within the scope of the present invention, since the characteristics shown in Table 2 were obtained or measurable, it is obvious that, in accordance with the present invention, base metals such as nickel can be used as materials for internal electrodes.

With respect to the sample Nos. 1 to 3 and Nos. 8 to 15, which were within the scope of the present invention, since the crystal axis ratio c/a determined by the X-ray diffraction method at a temperature of −25° C. or more satisfied the relationship $1.000 \leq c/a \leq 1.003$, heat emission when a high-frequency high voltage was applied was suppressed within a temperature rise of 20° C., and also, after a high-frequency high voltage was applied for a long period time, the defect rate in terms of insulation resistance was suppressed to 0%. Furthermore, in the high-temperature load test when a high to medium voltage DC was applied, a life time of 750 hours or more was secured, except sample No. 13.

In contrast, with respect to sample Nos. 4 to 7, which were out of the scope of the present invention, the phase transition point was higher than −25° C. For example, the c/a ratio at −25° C. exceeded 1.003, which was relatively large. Consequently, with respect to the heat emission when a high-frequency high voltage was applied, the temperature rise exceeded 20° C. or thermal runaway occurred, resulting in breakdown.

Moreover, when a rare-earth element was not included, as in sample No. 13, the life time measured in the high-temperature load test by the application of a DC voltage was significantly shortened. Thus, preferably, the nonreducing dielectric ceramic contains such a rare-earth element.

Additionally, in the example described above, although rare-earth elements as oxides are incorporated in starting powders, rare-earth elements may be incorporated as alkoxides, metallic organic compounds or the like.

In the example described above, although the phase transition point of the principal crystal phase is discussed, even if a secondary phase exists, characteristics are not substantially affected.

In the example described above, although $SiO_2$ is used as a sintering additive, even if glass is used as a sintering additive for the purpose of low-temperature sintering, characteristics are not substantially affected.

As described above, by using a nonreducing dielectric ceramic in accordance with the present invention for dielectric ceramic layers, a monolithic ceramic capacitor is obtained in which loss and heat emission are decreased when used at high frequencies and high voltages or high currents, and stable insulation resistance is exhibited in the AC high-temperature load or DC high-temperature load. In such a monolithic ceramic capacitor, a base metal such as nickel, a nickel alloy, copper or a copper alloy can be used as the material for internal electrodes without any problems.

With respect to the nonreducing dielectric ceramic in accordance with the present invention, by incorporating at least one rare-earth element selected from the group consisting of La, Ce, Pr, Nd, Sm, Eu, Gd, Th, Dy, Ho, Er, Tm, Yb, Lu, Y and Sc therein, the monolithic ceramic capacitor used under DC conditions can have satisfactory life properties.

What is claimed is:

1. A nonreducing dielectric ceramic having a perovskite structure represented by the formula $ABO_3$ with a principal crystal phase comprising barium titanate as a principal constituent, wherein the crystal axis ratio c/a determined by X-ray diffraction at a temperature of $-25°$ C. or more satisfies the relationship $1.000 \leq c/a \leq 1.003$.

2. A nonreducing dielectric ceramic according to claim 1, wherein, with respect to the temperature dependence of the relative dielectric constant measured at an AC electric field of 2 V rms/mm or less at a frequency of 1 kHz, the phase transition point of the principal crystal phase is less than $-25°$ C.

3. A nonreducing dielectric ceramic according to claim 2, wherein the nonreducing dielectric ceramic comprises at least one rare-earth element selected from the group consisting of La, Ce, Pr, Nd, Sm, Eu, Gd, Th, Dy, Ho, Er, Tm, Yb, Lu, Y and Sc.

4. A nonreducing dielectric ceramic according to claim 1, wherein the nonreducing dielectric ceramic comprises at least one rare-earth element selected from the group consisting of La, Ce, Pr, Nd, Sm, Eu, Gd, Th, Dy, Ho, Er, Tm, Yb, Lu, Y and Sc.

5. A nonreducing dielectric ceramic according to claim 4, wherein the nonreducing dielectric ceramic comprises barium titanate and a quantity of at least one member selected from the group consisting of $SrCO_3$, $CaCO_3$, $ZrO_2$ and MgO sufficient to realize said crystal axis ratio.

6. A nonreducing dielectric ceramic according to claim 3, wherein the nonreducing dielectric ceramic comprises barium titanate and a quantity of at least one member selected from the group consisting of $SrCO_3$, $CaCO_3$, $ZrO_2$ and MgO sufficient to realize said crystal axis ratio.

7. A nonreducing dielectric ceramic according to claim 2, wherein the nonreducing dielectric ceramic comprises barium titanate and a quantity of at least one member selected from the group consisting of $SrCO_3$, $CaCO_3$, $ZrO_2$ and MgO sufficient to realize said crystal axis ratio.

8. A nonreducing dielectric ceramic according to claim 1, wherein the nonreducing dielectric ceramic comprises barium titanate and a quantity of at least one member selected from the group consisting of $SrCO_3$, $CaCO_3$, $ZrO_2$ and MgO sufficient to realize said crystal axis ratio.

9. A monolithic ceramic capacitor comprising:

a plurality of dielectric ceramic layers;

internal electrodes between said dielectric ceramic layers; and external electrodes electrically connected to the internal electrodes, wherein the dielectric ceramic layers comprise a nonreducing dielectric ceramic according to claim 1.

10. A monolithic ceramic capacitor according to claim 9, wherein the internal electrodes comprise a material selected from the group consisting of nickel, a nickel alloy, copper and a copper alloy.

11. A monolithic ceramic capacitor according to claim 10, wherein each external electrode comprises a first layer comprising a sintered layer comprising powdered conductive metal and optionally a glass frit, and a second layer comprising a plating layer.

12. A monolithic ceramic capacitor comprising:

a plurality of dielectric ceramic layers;

internal electrodes between said dielectric ceramic layers; and external electrodes electrically connected to the internal electrodes, wherein the dielectric ceramic layers comprise a nonreducing dielectric ceramic according to claim 2.

13. A monolithic ceramic capacitor according to claim 12, wherein the internal electrodes comprise a material selected from the group consisting of nickel, a nickel alloy, copper and a copper alloy.

14. A monolithic ceramic capacitor according to claim 13, wherein each external electrode comprises a first layer comprising a sintered layer comprising powdered conductive metal and optionally a glass frit, and a second layer comprising a plating layer.

15. A monolithic ceramic capacitor comprising:

a plurality of dielectric ceramic layers;

internal electrodes between said dielectric ceramic layers; and external electrodes electrically connected to the internal electrodes, wherein the dielectric ceramic layers comprise a nonreducing dielectric ceramic according to claim 3.

16. A monolithic ceramic capacitor according to claim 15, wherein the internal electrodes comprise a material selected from the group consisting of nickel, a nickel alloy, copper and a copper alloy.

17. A monolithic ceramic capacitor according to claim 16, wherein each external electrode comprises a first layer comprising a sintered layer comprising powdered conductive metal and optionally a glass frit, and a second layer comprising a plating layer.

18. A monolithic ceramic capacitor comprising:

a plurality of dielectric ceramic layers;

internal electrodes between said dielectric ceramic layers; and external electrodes electrically connected to the internal electrodes, wherein the dielectric ceramic layers comprise a nonreducing dielectric ceramic according to claim 4.

19. A monolithic ceramic capacitor according to claim 18, wherein the internal electrodes comprise a material selected from the group consisting of nickel, a nickel alloy, copper and a copper alloy.

20. A monolithic ceramic capacitor according to claim 19, wherein each external electrode comprises a first layer comprising a sintered layer comprising powdered conductive metal and optionally a glass frit, and a second layer comprising a plating layer.

* * * * *